(12) United States Patent
Roy

(10) Patent No.: US 11,256,815 B2
(45) Date of Patent: Feb. 22, 2022

(54) OBJECT STORAGE SYSTEM WITH SECURE OBJECT REPLICATION

(71) Applicant: Western Digital Technologies, Inc., San Jose, CA (US)

(72) Inventor: Souvik Roy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 799 days.

(21) Appl. No.: 16/006,816

(22) Filed: Jun. 12, 2018

(65) Prior Publication Data
US 2019/0377886 A1    Dec. 12, 2019

(51) Int. Cl.
*G06F 16/27* (2019.01)
*G06F 21/60* (2013.01)
*H04L 9/08* (2006.01)

(52) U.S. Cl.
CPC .......... *G06F 21/602* (2013.01); *G06F 16/27* (2019.01); *H04L 9/0861* (2013.01)

(58) Field of Classification Search
CPC ....... G06F 21/602; G06F 16/27; H04L 9/0861
USPC .......................................................... 713/193
See application file for complete search history.

(56) References Cited

U.S. PATENT DOCUMENTS

| | | | | |
|---|---|---|---|---|
| 8,285,681 B2 * | 10/2012 | Prahlad | ............... | G06F 3/0649 707/640 |
| 8,321,688 B2 | 11/2012 | Auradkar et al. | | |
| 8,416,954 B1 * | 4/2013 | Raizen | ............... | G06F 21/78 380/277 |
| 9,729,524 B1 * | 8/2017 | Brandwine | ............ | H04L 9/3247 |
| 2010/0310075 A1 | 12/2010 | Lin et al. | | |
| 2011/0040964 A1 | 2/2011 | Nussbaum et al. | | |
| 2016/0078245 A1 * | 3/2016 | Amarendran | ....... | H04L 63/0428 713/193 |
| 2016/0132684 A1 * | 5/2016 | Barbas | ............... | G06F 11/1448 713/165 |
| 2016/0191635 A1 * | 6/2016 | Greenan | ............ | H04L 67/1097 709/219 |
| 2017/0208050 A1 * | 7/2017 | Iasi | ...................... | H04L 63/061 |
| 2017/0228290 A1 * | 8/2017 | Maccanti | ............ | G06F 11/1451 |

(Continued)

FOREIGN PATENT DOCUMENTS

JP    5118508 A2    1/2013

OTHER PUBLICATIONS

International Search Report and Written Opinion of Application No. PCT/US2019/019634, dated Jun. 20, 2019, p. 1-9.

*Primary Examiner* — Dereena T Cattungal
(74) *Attorney, Agent, or Firm* — Patent Law Works LLP

(57) ABSTRACT

Example distributed object storage systems and methods provide secure object replication. Data objects are encrypted for reading and decrypted for writing to prevent unwanted data access by a replication user credential that does not need access to the user data. During an object storage operation for reading and writing an identified data object, read operations are encrypted to create an encrypted data object corresponding to the identified data object. The encrypted data object may be moved between a first storage node and a second storage node. The encrypted data object is decrypted during write operations to write the identified data object to the second storage node. A user credential in the object storage operation may identify a replication user credential for selectively encrypting and decrypting the identified data object.

20 Claims, 7 Drawing Sheets

(56) References Cited

U.S. PATENT DOCUMENTS

2018/0012028 A1    1/2018  Barbas et al.
2019/0013936 A1*  1/2019  Murray .................. H04L 9/088
2019/0340136 A1*  11/2019  Irwin .................... G06F 3/0683
2019/0354710 A1*  11/2019  Leshinsky ............. G06F 21/602

* cited by examiner

OBJECT STORAGE SYSTEM WITH SECURE OBJECT REPLICATION

TECHNICAL FIELD

The present disclosure generally relates to data storage, and in a more particular example, to distributed data storage.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

Such large-scale storage systems generally distribute the stored data objects in the object storage system over multiple storage elements, such as for example hard disks, or multiple components such as storage nodes comprising a plurality of such storage elements. However, as the number of storage elements in such a distributed object storage system increase, equally the probability of failure of one or more of these storage elements increases. To cope with this issue, distributed object storage system generally use some level of redundancy, which allows the system to cope with a failure of one or more storage elements without data loss.

In its simplest form, redundancy at the object store level is achieved by replication, which means storing multiple copies of a data object on multiple storage elements of the distributed object storage system. When one of the storage elements storing a copy of the data object fails, this data object can still be recovered from another storage element holding a copy. In some storage systems, replication of data objects for redundancy is supervised by an administrator or as an automated system task and may be largely invisible to application programmers and other users supported by the storage system. For example, in hosted storage models, replication processes may be designed to comply with a defined quality of service, but otherwise require little input from application users and data owners.

In object storage systems that comply with Simple Storage Services (S3) protocols, data objects are generally put into the storage system by an application user using a PUT command. It may then be a system task to replicate the stored objects to another site, which can include another storage site of the same object storage provider or another S3 compliant provider. The replication solution is usually comprised of multiple GET-PUT processes run in parallel. In some integrated solutions, user credentials are used to secure data at rest (in storage elements) and during inter-region or inter-site transfer.

More specifically, there may be multiple users (bucket owners) with their own access and related encryption keys. They may store data objects in the buckets to which they have access and the data may be secured at rest in a variety of ways (server side encryption (SSE), server side encryption with customer encryption (SSE-C), client side encryption, etc.). However, using the actual bucket owner user credentials during replication may lead to degraded performance. Lower network libraries, such as those responsible for replication, create connections with a certain source storage node and a certain destination storage node that may be reused for multiple transfers. If a replication agent is replicating objects from different bucket owners, it would have to close connections, switch user credentials, and establish a new connection for each transfer because the owner-specific connections cannot be reused. These changes have performance costs.

Further, when replicating data objects to a different bucket on a different site, a replication agent may not have access to the user credentials of both bucket owners. The replication agent needs access credentials to read from the source storage node and write to the destination storage node, which may be challenging to manage across multiple deployments and/or sites. In many solutions, this involves creating an administrative or support credential that has access to all buckets, which may represent a significant security risk. Even if the communication channels are secure, such as using hypertext transport protocol secure (HTTPS), user data is at risk of getting exposed by the transporting applications, such as replication agents, during processing. Some of these transporting applications may be hosted applications maintained by a third party, reducing the level of trust in those applications from a data owner's perspective. An all-access credential may be misused purposefully or unknowingly by transporting applications or agents to expose user data. Even though the storage nodes ensure data security at rest and secure communication channels ensure data security during routing, intermediate processing may enable security holes that allow user data access without the user's knowledge.

Even in on-premise solutions, multiple departments and/or user groups may maintain their own controls, access credentials, and security standards. Multiple deployments may make it difficult for data security to be maintained between the storage nodes in compliance with the secure data movement standards of each department and/or deployment using individual owner user credentials or enabling an all-access user, even if the all-access user credentials can be hidden.

A need exists for at least improved secure replication of data objects to prevent unauthorized access to user data. For example, when replicating data among S3 compliant solutions or providers, a need exists to prevent user data from being exposed during replication.

SUMMARY

Various aspects for data object replication, particularly, secure data object replication, in distributed object storage systems are described. In an innovative aspect, a system comprises at least one processor, at least one memory coupled to the at least one processor, and a plurality of storage nodes configured to receive data objects. A controller node is stored in the at least one memory and executable by the at least one processor to communicate with the plurality of storage nodes for reading and writing data objects. An authenticator is stored in the at least one memory and executable by the at least one processor to identify a user credential for reading an identified data object requested in an object storage operation, the user credential having a user type. The user type selected from an owner user type and a replication user type. An encrypt engine is stored in the at least one memory and selectively executable by the at least one processor based on the user type to encrypt the identified data object while reading the identified data object from at least one of the plurality of storage nodes responsive to the user type being the replication user type. The controller node is executable to read the identified data object to execute the object storage operation.

In various embodiments, the authenticator is further executable by the at least one processor to identify the user credential for writing the identified data object to at least one of the plurality of storage nodes. The storage system may further comprise a decrypt engine stored in the at least one memory and selectively executable by the at least one processor based on the user type to decrypt the identified data object while writing the identified data object to at least one of the plurality of storage nodes responsive to the user type being the replication user type. The controller node is executable to write the identified data object to execute the object storage operation. The controller node is executable to receive the identified data object from a different storage system and the identified data object is encrypted when the identified data object is received. The encrypt engine, the decrypt engine, and the different storage system may each include a common encryption key. The authenticator, the encrypt engine, and the decrypt engine may be included in a proxy application in communication with the controller node. The object storage operation may be processed by the proxy application prior to reading or writing the identified data object.

In some embodiments, the user type is a flag associated with the object storage operation processed by the authenticator. The storage system may further comprise a cache memory for storing the identified data objects in the controller node during object storage operations. The identified data object may be encrypted by the encrypt engine before being stored in the cache memory.

In various embodiments, the controller node is executable to set the user type for an object storage operation to the replication user type for system tasks not initiated by an application user and further comprises an object storage agent. The object storage agent may be configured for sending hypertext transfer protocol (HTTP) calls conforming to a simple storage services application protocol interface and using a GET operation to read the identified data object from the first storage node and a PUT operation to write the identified data object to the second storage node. The identified data object may be selectively routed through the encrypt engine during the GET operation and the decrypt engine during the PUT operation when the user type is the replication user type. The HTTP calls may be encrypted for routing among the plurality of storage nodes independent of the encrypt engine encrypting the identified data object.

In another innovative aspect, a computer-implemented method provides secure data object replication. An object storage operation is initiated for reading and writing an identified data object. The identified data object is read from a first storage node. Read operations are encrypted to create an encrypted data object corresponding to the identified data object when reading the identified data object from the first storage node. The encrypted data object is moved from the first storage node to a second storage node. The write operations are decrypted from the encrypted data object when writing the identified data object to the second storage node. The identified data object is written to the second storage node.

In various embodiments, initiating the object storage operation includes using a user credential for reading and writing the identified data object, the user credential has a user type, and the user type is selected from an owner user type and a replication user type. The method further comprises identifying the user type from the user credential for the object storage operation. Encrypting read operations is selectively executed based on the user type being the replication user type and decrypting read operations is selectively executed based on the user type being the replication user type.

In some embodiments, reading the identified data object and writing the identified data object are executed by a controller node configured to communicate with a plurality of storage nodes. The plurality of storage nodes includes the first storage node and the second storage node. Identifying the user type from the user credential may be executed by an authenticator in communication with the controller node. Encrypting read operations may be executed by an encrypt engine in communication with the controller node and decrypting read operations may be executed by a decrypt engine in communication with the controller node. The first storage node and the second storage node may be in different storage systems. Encrypting read operations and decrypting write operations may use a common encryption key. The user type may be a flag associated with the object storage operation, wherein a first value of the flag is the owner user type and a second value of the flag is the replication user type.

In various embodiments, reading the identified data object includes sending a first HTTP call conforming to a simple storage services application protocol interface GET operation to the first storage node and writing the identified data object includes sending a second HTTP call conforming to a simple storage services application protocol interface PUT operation to the second storage node. Identifying the user type from the user credential, encrypting read operations, and decrypting write operations may be executed by a proxy application. The object storage operation may be processed by the proxy application prior to reading and writing the identified data object. The method may further comprise setting the user type for the object storage operation to the replication user type for system tasks not initiated by an application user. The method may further comprise storing the identified data object in a cache memory after reading the identified data object from the first storage node and before writing the identified data object to the second storage node.

In yet another innovative aspect, a system provides secure data object replication. Means are provided for initiating an object storage operation using a user credential for reading and writing an identified data object. The user credential has a user type and the user type selected from an owner user type and a replication user type. Means are provided for identifying the user type from the user credential for the object storage operation. Means are provided for selectively encrypting read operations based on the user type to encrypt the identified data object when reading the identified data object from a first storage node if the user type is the replication user type. Means are provided for reading the identified data object from the first storage node. Means are provided for selectively decrypting write operations based on the user type to decrypt the identified data object when writing the identified data object to a second storage node if the user type is the replication user type. Means are provided for writing the identified data object to the second storage node.

The various embodiments advantageously apply the teachings of distributed object storage networks and/or systems to improve the functionality of such computer systems. The various embodiments include operations to overcome or at least reduce the issues in the previous storage networks and/or systems discussed above and, accordingly, are more secure than other computing networks. That is, the various embodiments disclosed herein include hardware and/or software with functionality to improve the security of data object replication, based on selectively encrypting and decrypting data objects to avoid exposing application data content to administrative users. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
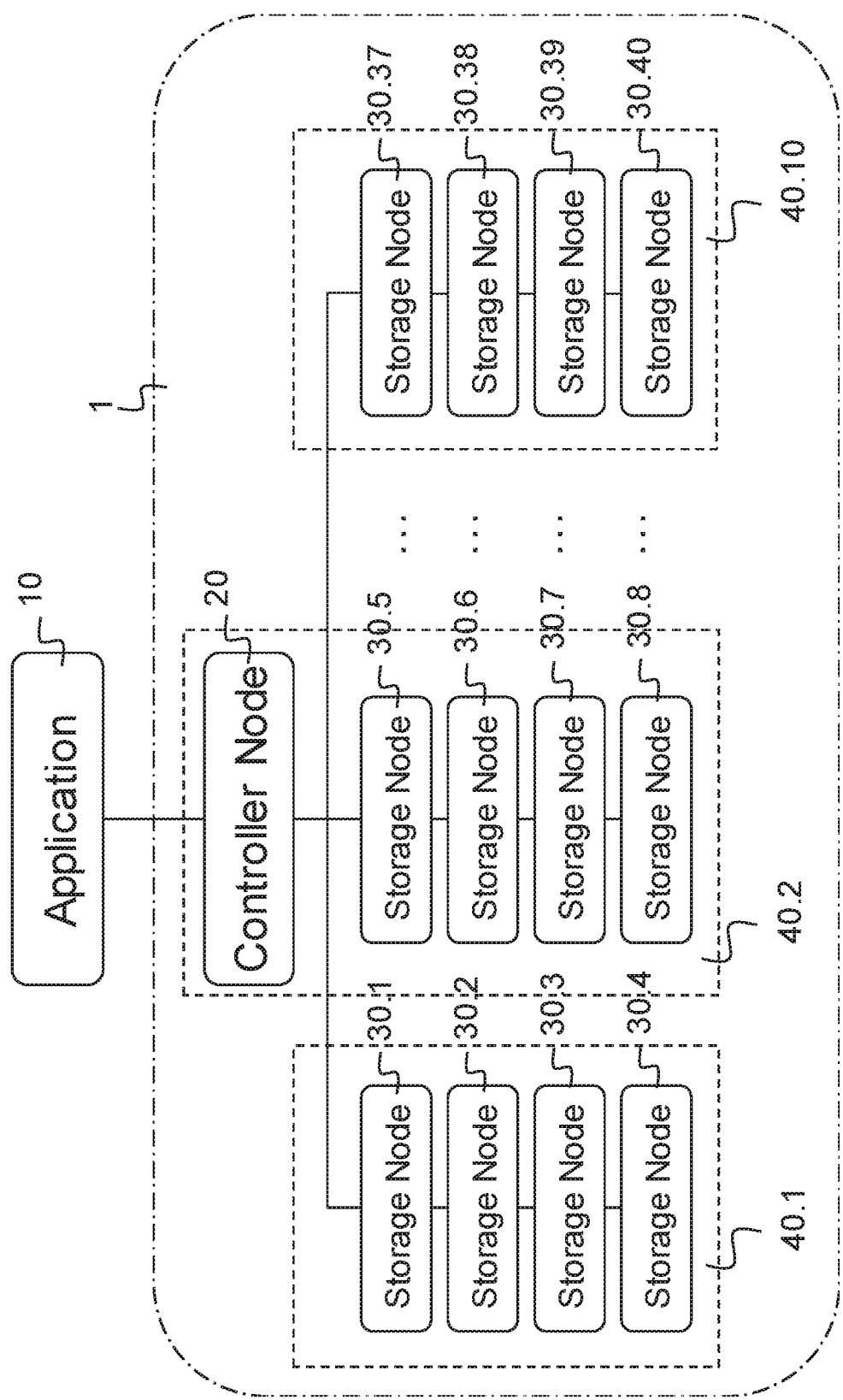
FIG. 1 schematically illustrates an example embodiment of a distributed object storage system.

FIG. 1 shows an embodiment of an example distributed storage system 1. According to this embodiment the distributed storage system 1 may be implemented as a distributed object storage system 1 which is coupled to an application 10 for transferring data objects. The connection between the distributed storage system 1 and the application 10 could, for example, be implemented as a suitable data communication network. Such an application 10 could, for example, be a dedicated software application running on a computing device, such as a personal computer, a laptop, a wireless telephone, a personal digital assistant or any other type of communication device that is able to interface directly with the distributed storage system 1. However, according to alternative embodiments, the application 10 could for example comprise a suitable file system which enables a general purpose software application to interface with the distributed storage system 1, an application programming interface (API) library for the distributed storage system 1, etc.

As further shown in FIG. 1, the distributed storage system 1 comprises a controller node 20 and a plurality of storage nodes 30.1-30.40 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Controller node 20, storage nodes 30 and the device comprising application 10 may connect to the data communication network by means of suitable wired, wireless, optical, etc. network connections or any suitable combination of such network connections. Although the embodiment of FIG. 1A shows only a single controller node 20 and forty storage nodes 30, according to alternative embodiments the distributed storage system 1 could comprise any other suitable number of storage nodes 30 and, for example, two, three or more controller nodes 20 coupled to these storage nodes 30.

These controller nodes 20 and storage nodes 30 can be built as general-purpose computers, however more frequently they are physically adapted for arrangement in large data centers, where they are arranged in modular racks 40 comprising standard dimensions. Exemplary controller nodes 20 and storage nodes 30 may be dimensioned to take up a single unit of such rack 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary controller node 20 may comprise high-performance servers and provide network access to applications 10 over multiple high bandwidth Ethernet network interfaces. Data can be transferred between applications 10 and such a controller node 20 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 30. In some embodiments, HTTP/REST protocols complying with S3 may enable data transfer through a REST application protocol interfaces (API). Preferably, such controller nodes 20 operate as a highly available cluster of controller nodes, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4; 30.5-30.8; and 30.7-30.40 each are respectively grouped into racks 40.1, 40.2, . . . 40.10. Controller node 20 could for example be located in rack 40.2. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
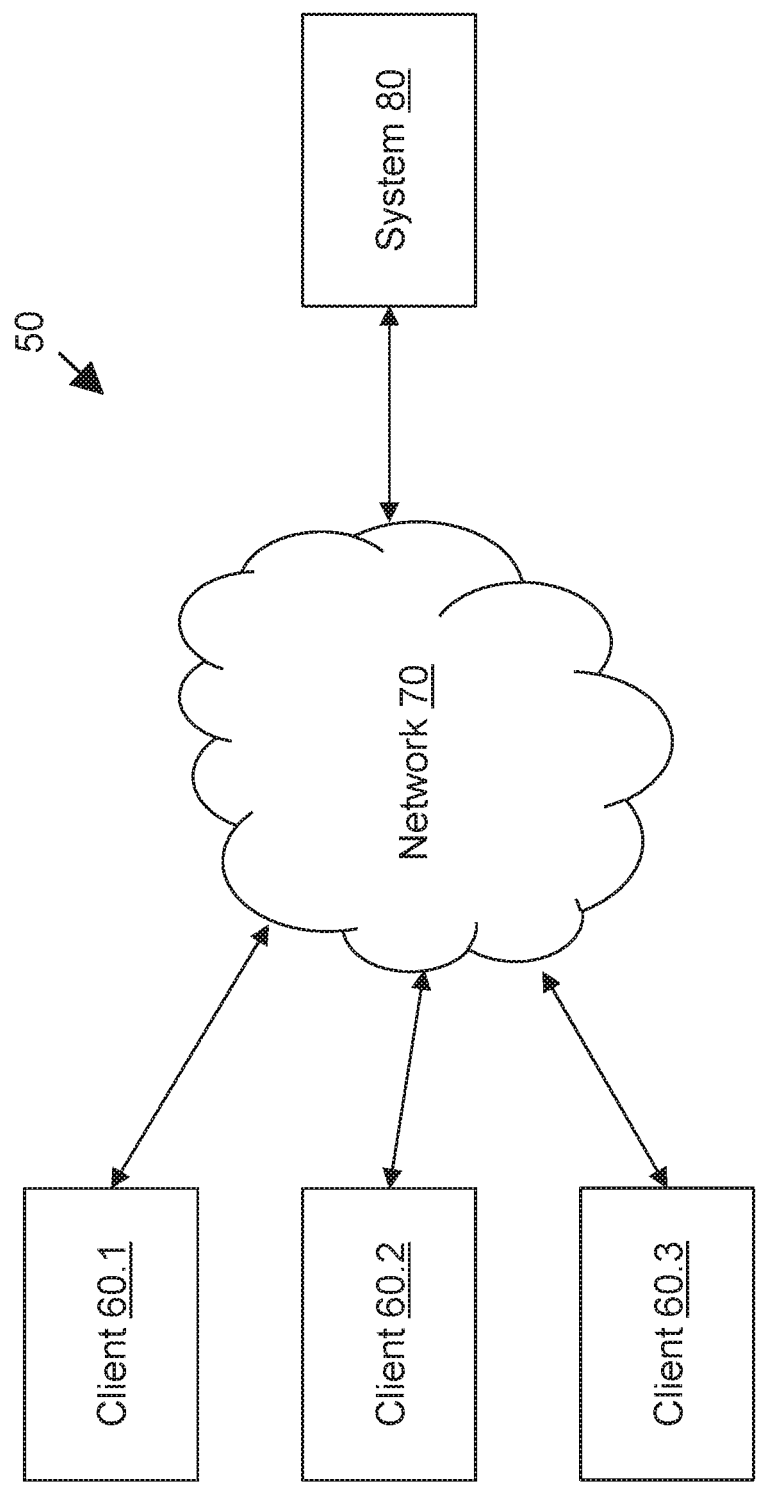
FIG. 2 schematically illustrates an example client architecture in which some embodiments of the distributed object storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications, such as application 10 in FIG. 1, to use or manage a distributed storage system, such as distributed storage system 1 in FIG. 1.

Figure 3:
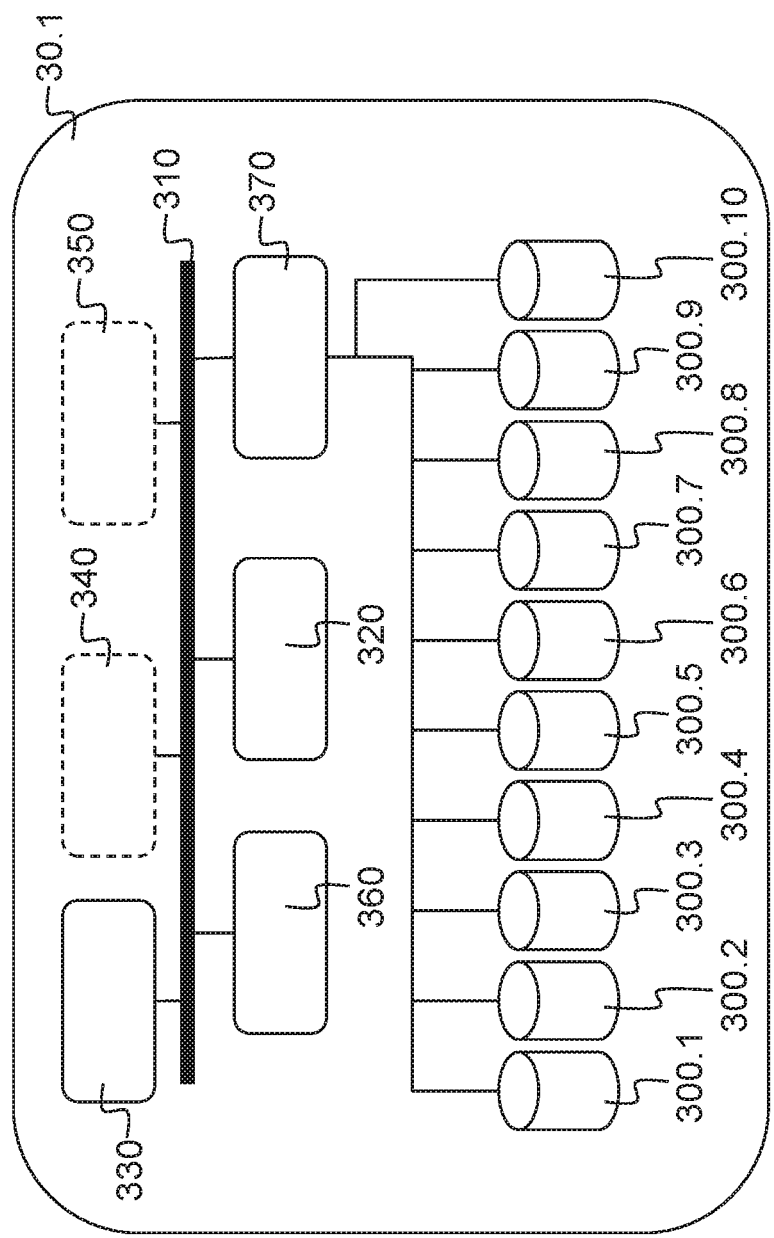
FIG. 3 schematically illustrates an example embodiment of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed object storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system 1 to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system 1. Storing the data offered for storage by the application 10 in the form of a data object, also referred to as object storage, may have specific advantages over other storage schemes such as conventional block-based storage or conventional file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system 1.

Figure 4:
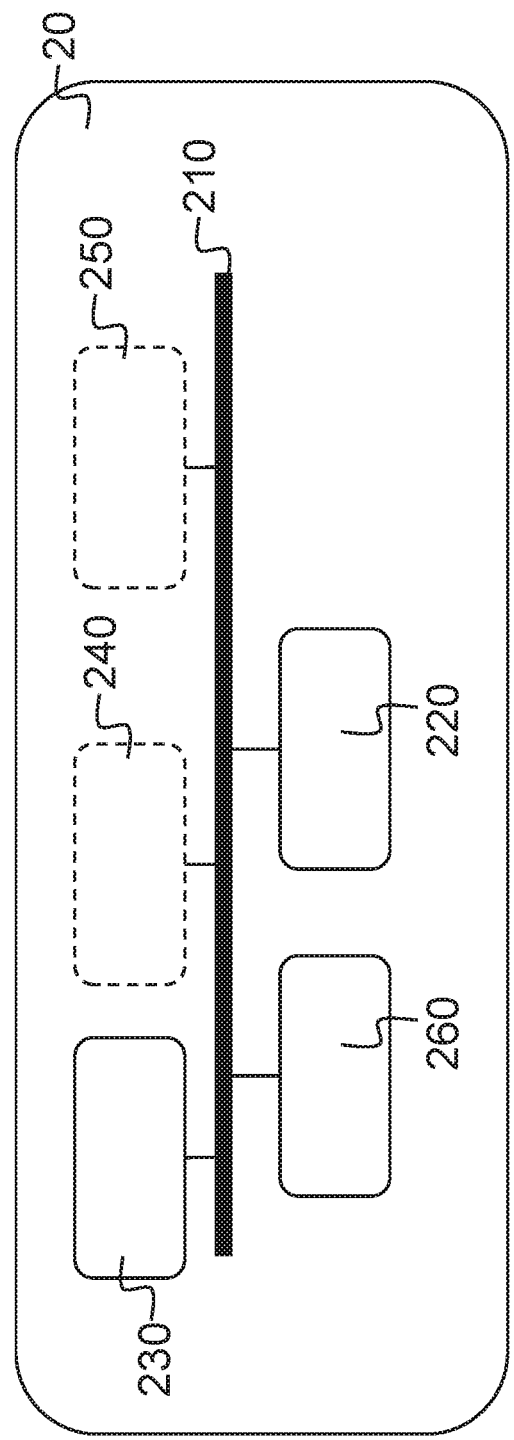
FIG. 4 schematically illustrates an example embodiment of a controller node of the distributed storage system of FIG. 1.

FIG. 4 shows a schematic representation of an embodiment of the controller node 20. Controller node 20 may comprise a bus 210, a processor 220, a local memory 230, one or more optional input units 240, one or more optional output units 250. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

According to an alternative embodiment, the controller node 20 could have an identical design as a storage node 30, or according to still a further alternative embodiment one of the storage nodes 30 of the distributed object storage system could perform both the function of a controller node 20 and a storage node 30. According to still further embodiments, the components of the controller node 20 as described in more detail below could be distributed amongst a plurality of controller nodes 20 and/or storage nodes 30 in any suitable way. According to still a further embodiment, the device on which the application 10 runs is a controller node 20.

Figure 5:
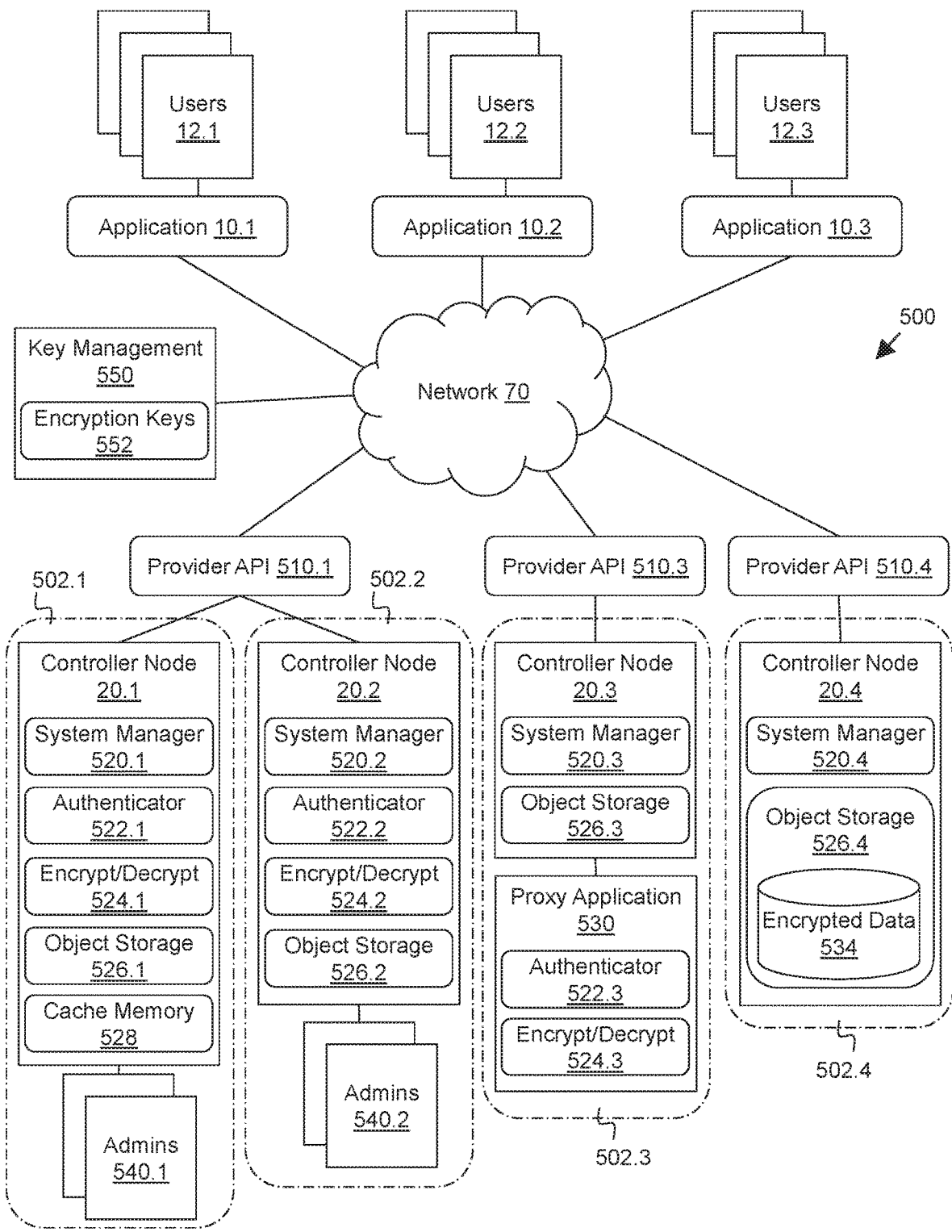
FIG. 5 schematically illustrates some example elements of a distributed object storage system, including example configurations of the controller node of FIG. 4, in more detail.

FIG. 5 schematically shows a distributed object storage system 500 that may incorporate elements and configurations similar to those shown in FIGS. 1-4. A plurality of users 12.1-12.3 access a plurality of applications 10.1-10.3 for whatever computer function those applications 10.1-10.3 are configured to support, for example, a variety of enterprise computing or consumer applications based on large volumes of data. Users 12.1-12.3 may include a variety of application programmers, administrators, and/or end users, depending on the business models and use cases involved. In some embodiments, users 12.1-12.3 may include one or more data owners with access privileges, such as read and/or write access, to some portion of the data being managed and stored in distributed object storage system 500. For example, users 12.1-12.3 may each have an associated user credential with defined access privileges organized and managed by their respective organizations and roles in using applications 10.1-10.3. Some or all of these application user credentials may correspond to access privileges to identifiable data objects in distributed object storage system 500. For example, one or more of users 12.1-12.3 may have corresponding application user credentials with read/write privileges to specific buckets and/or data objects in distributed object storage system 500 that are addressable by their GUID and an appropriate HTTP/REST API. These application user credentials for users 12.1-12.3 may be used to access data objects in distributed object storage system 500 through network 70.

In some embodiments, distributed object storage system 500 may include multiple storage providers with separately defined provider APIs 510.1-510.4 for accessing data objects stored in their respective storage locations 502.1-502.4. For example, each provider API 510.1-510.4 may define protocols and arguments for accessing data objects related to applications 10-1-10.3 stored in the respective providers' storage locations 502.1-502.4. Provider APIs 510.1-510.4 may be instances of REST APIs compatible with S3 protocols and, in some instances, including proprietary extensions or engineering solutions that vary among providers. Provider APIs 510.1-510.4 may represent heterogeneous S3 data stores hosted at different storage locations 502.1-502.4.

In the example shown, provider API 510.1 provides a single interface standard for multiple provider storage locations 502.1 and 502.2 maintained by a single provider. For example, storage locations 502.1 and 502.2 may be different data storage facilities with different geographic locations, such as a data center in the U.S. and a data center in Europe. Storage locations 502.1 and 502.2 may include different data storage systems, data management procedures, and/or administrative users employed by a common provider. In the embodiment shown, storage locations 502.1 and 502.2 may implement similar but not identical controller nodes 20.1 and 20.2 with different administrative users 540.1 and 540.2.

Provider API 510.3 and 510.4 may represent other storage locations 502.3 and 502.4 controlled by other providers, but with whom storage locations 502.1 and 502.2 may need to exchange data. For example, storage location 502.1 may be a primary storage location of data objects related to one or more of applications 10.1-10.3 and storage location 502.2 may be a secondary storage location for data replication owned by the same provider. Storage locations 502.3 and 502.4 may be third party storage locations selected by the storage provider of storage locations 502.1 and 502.2 or by one or more users 12.1-12.3 for additional capacity, proximity, features, risk management, or other factors. For example, storage locations 502.1-502.4 may represent a number of cloud storage providers offering S3 compliant storage solutions that need to interoperate to serve the storage and replication needs of users 12.1-12.3. As another example, storage locations 502.1-502.2 could be on premise object storage systems maintained by an enterprise and storage locations 501.3 and 501.4 could be third party cloud storage providers. Note that the number of providers and locations shown in the example is limited for ease of description, but any number of interoperable provider APIs and storage locations could be included in distributed object storage system 500.

In FIG. 5, each of storage locations 502.1-502.4 includes an embodiment of the controller node 20. Each of controller nodes 20.1-20.4 includes a variety of functional modules for completing object storage operations. These functional modules may include five types: system managers 520.1-520.4, authenticators 522.1-522.2, encrypt/decrypt engines 524.1-524.2, object storage agents 526.1-526.4, and cache memory 528. In the example shown, storage location 520.3 may include a separate proxy application 530 outside of and communicating with controller node 20.3 for accessing authenticator 522.3 and encrypt/decrypt engines 524.3. These modules 520, 522, 524, 526, 528 can, for example, be implemented as programming instructions stored in local memory 230 of the controller node 20 for execution by its processor 220.

Modules 520, 522, 524, 526, 528 in storage locations 502.1-502.4 may comprise various example configurations of subsystems for managing secure storage object replication among storage locations 502.1-502.4 and their respective storage nodes. Each of these subsystems may be accessed by object storage commands received by controller nodes 20.1-20.4 through provider APIs 510.1-510.4 that correspond to object storage operations for execution by controller nodes 20.1-20.4. For example, users 12.1-12.3 of applications 10.1-10.3 may initiate object storage operations based on their data access or management needs. Administrative users 540.1, 540.2 may initiate object storage operations for various administrative or data management tasks. System managers 520.1-520.4 may include scripts, agents, or other logic that runs on a scheduled or other automated basis for initiating system tasks, including data replication.

System managers 520.1-520.4 may include various functions related to managing object stores on an automated basis. For example, system managers 520.1-520.4 may implement one or more rule systems to generate and initiate system tasks, such as data object replication. System managers 520.1-520.4 may initiate system tasks based solely on schedules, conditions, events, or other automated bases or may respond to user action, such as a request from one of administrative users 540.1-540.2. In some embodiments, administrative users 540.1-540.2 may have access to controller nodes 20.1, 20.2 through an interface, such as input unit 240 and output unit 250, a LAN or WAN connection, or a remote administrative application over network 70 and using provider API 510.1.

The administrative users 540.1, 540.2 may have administrative user credentials to enable them to complete system tasks using controller nodes 20.1, 20.2. These user credentials may grant them access to object storage operations associated with management of data objects containing user data that does not belong to the provider and should not be exposed to administrative users 540.1, 540.2. In some embodiments, system managers 520.1, 520.2 may either be associated with one or more of administrative users 540.1, 540.2 for user credentials or may have one or more user credentials specifically associated with system tasks generated by system managers 520.1, 520.2. System managers 520.1-520.4 may include one or more user credentials for system tasks not initiated by application users 12.1-12.3 and these user credentials may be identified as untrusted for the purposes of object storage operations related to data objects owned by application users 12.1-12.3. In some embodiments, system managers 520.1-520.4 may maintain a table or other data structure for user credentials not belonging to application users 12.1-12.3 and identifying user types. These user credentials for system tasks may be setup with read/write privileges to all data objects accessible through their respective controller nodes 20.1-20.4 and acceptable to object storage agents 526.1-526.4. System managers 520.1-520.4 may receive or generate object storage operations related to system tasks not initiated by application users 12.1-12.3 and set the user type for those object storage operations to a replication user type for the related user credentials. In some embodiments, system managers 520.1-520.4 may generate or receive an object replication work item for processing by their respective controller nodes 20.1-20.4 and associate a replication user type with the resulting object storage operation.

Authenticators 522.1-522.3 receive object storage operation requests and evaluate associated user credentials to determine whether the user credentials allow the requested object storage operation to be processed. For example, in some object storage systems, read/write permissions are granted to data object or bucket owners and authenticators 522.1-522.3 compare the received user credentials against a list, table, or other data structure identifying user credentials with read/write access. If no matching user credential is found (e.g. not a valid bucket owner) or the permissions associated with the user credential are insufficient for the requested object storage operation, authenticators 522.1-522.3 may return an error message to the user or requesting system. If a matching user credential is found to allow access to the data object, authenticators 522.1-522.3 may further evaluate whether the user credential is associated with an owner user (e.g. application user credentials) or a replication user (e.g. administrative or system credentials).

Authenticators 522.1-522.3 may further include an indicator of user type, such as a flag or similar variable or field, that may identify owner or replication users. In this context, owner type users may refer to users who are authorized by the data owners to have access to particular data objects or buckets for application purposes and replication type users may refer to users who have only custodial duties related to maintaining the data objects and the systems that host them, such as administrators and system manager functions, and do not need access to the actual data contents in the data objects. These replication user types may need read/write and other privileges for completing their object storage operations, including data replication, but they may not need to be able to decode or display the contents of the data objects they are manipulating. In some embodiments, user type will be associated with the user credential within the object storage operation request. In alternate embodiments, the user type may be associated with the user credential authentication data, such as an entry in the list or table used by authenticators 522.1-522.3 to validate the received user credentials.

Based on the user type, authenticators 522.1-522.3 may direct the processing of the object storage operation request down an owner path or a replication path. In some embodiments, the owner path invokes standard GET/PUT operations through object storage agents 526.1-526.4 and the replication path is routed through encrypt/decrypt engines 524.1-524.3. The operation of the replication and owner paths is further described below with regard to FIGS. 6-7.

Encrypt/decrypt engines 524.1-524.3 may each include an encrypt engine and/or decrypt engine capable of encrypting and decrypting (respectively) a data object to produce or decipher an encrypted data object, such as a data object with ciphered data and an associated secret key. Encrypt/decrypt engines may utilize any encryption or decryption algorithm of sufficient robustness for preventing unwanted data access that meets the processing and key management requirements of distributed storage system 1. For example, controller nodes 20.1-20.4 and/or proxy application 530 may include or provide access to one or more encrypt or decrypt functions available for use by multiple subsystems. In some embodiments, encrypt/decrypt engines 524.1-524.3 may include a dedicated instance of an encrypt engine and/or a decrypt engine through which data objects retrieved by object storage 526.1-526.3 may be selectively passed before streaming, caching, or writing the data to another location. In some embodiments, encrypt/decrypt engines 524.1-524.3 may perform object-level or object part-level encryption/decryption of user data as it is read from and written to storage media and this encryption is independent of any other encryption engines supporting data encryption on the storage media or encryption used in communication protocols between systems and storage nodes, such as HTTPS.

In some embodiments, encrypt/decrypt engines 524.1-524.3 may use asymmetric encryption based on public/private key pairs for generating and sharing a secret key between an encrypting engine in one location and a decrypting engine in another location. In other embodiments, symmetric encryption may be used to reduce processing overhead by sharing a common secret key between encrypt/decrypt engines 524.1-524.3. Key management may be used among and between encrypt/decrypt engines 524.1-524.3 to provide secure access to public, private, and/or shared secret keys. In some embodiments, encrypt/decrypt engines 524.1-524.3 may include key management services or have access to key management functions in controller nodes 20.1-20.4 and/or proxy application 530. In some embodiments, key management may be provided by a key management module 550 hosting one or more encryption keys 552. Encryption keys 552 may include public keys and/or shared secret keys for supporting encrypt/decrypt engines 524.1-524.3. In some embodiments, key management 550 may be a hosted key management solution accessible over network 70 by controller nodes 20.1-20.4 and/or proxy application 530. In other embodiments, key management 550 and encryption keys 552 may be provided through one or more decentralized or standards-based key management protocols instantiated within locations 502.1-502.3.

Object storage agents 526.1-526.4 may include resources for processing object storage operations, such as GET, PUT, DELETE, and similar commands in compliance with a selected object storage standard, such as S3. In some embodiments, object storage agents 526.1-526.4 may receive an object replication work item. This work item may include source object URL, source bucket read user credentials, destination URL, and destination bucket write user credentials. Object storage agents 526.1-526.4 may open a connection to a first storage location using the source bucket read user credentials and process one or more GET commands to stream and/or cache the identified data object. Object storage agents 526.1-526.4 may open a connection to a second storage location using the destination bucket write user credentials and process one or more PUT commands to stream and/or write the identified data object. In some embodiments, object storage agents 526.1-526.4 may use cache memory 528 to temporarily store connections, data objects, and/or parts of data objects to improve data retrieval and/or processing times, reliability, and/or efficiency between repeated GETs, PUTs, or other object storage operations.

When a replication user is identified by authenticators 522.1-522.3, object storage agents 526.1-526.4 may selectively route data objects being read to encrypt/decrypt engines 524.1-524.3 to be encrypted before streaming or writing to cache. When a data object is being received from a replication user (as identified by authenticators 522.1-522.3), object storage agents 526.1-526.4 may selectively receive data objects to be written from encrypt/decrypt engines 524.1-524.3 such that the encrypted data objects are decrypted before streaming or writing to their destination storage location. As shown for location 502.4, some provider APIs and controller nodes, such as provider API 510.4 and controller node 20.4, may not support an authenticator and encrypt/decrypt engine for decrypting data objects during writes or encrypting them during reads. In this case (or based on other considerations at location 502.4 or in the configurations of distributed object storage system 500), object storage agent 526.4 may receive encrypted data objects and store them as encrypted data 534.

In some embodiments, object storage agents 526.1-526.4 may include one or more replication engines to receive and perform replication work items. For example, object storage agents 526.1-526.4 may include a plurality of replication engines running in parallel to complete data replication with improved efficiency. Each replication engine may be capable of receiving replication tasks from authenticators 522.1-522.3 and/or encrypt/decrypt engines 524.1-524.3 and performing those replication tasks in accordance with the command syntax and communication protocols of storage nodes 30. In general, this may include retrieving data from one location, such as a local data source, using a GET or similar command and sending it to another location, such as a remote storage node, using a PUT or similar command. Replication engines may also include administrative messaging to communicate when replication tasks complete, such as a SUCCESS message when a transfer to a target storage node is complete. Similarly, replication engines may receive administrative messages from storage nodes 30 and provide relevant messages to authenticators 522.1-522.3, encrypt/decrypt engines 524.1-524.3, and/or other components of distributed storage system 1.

Figure 6:
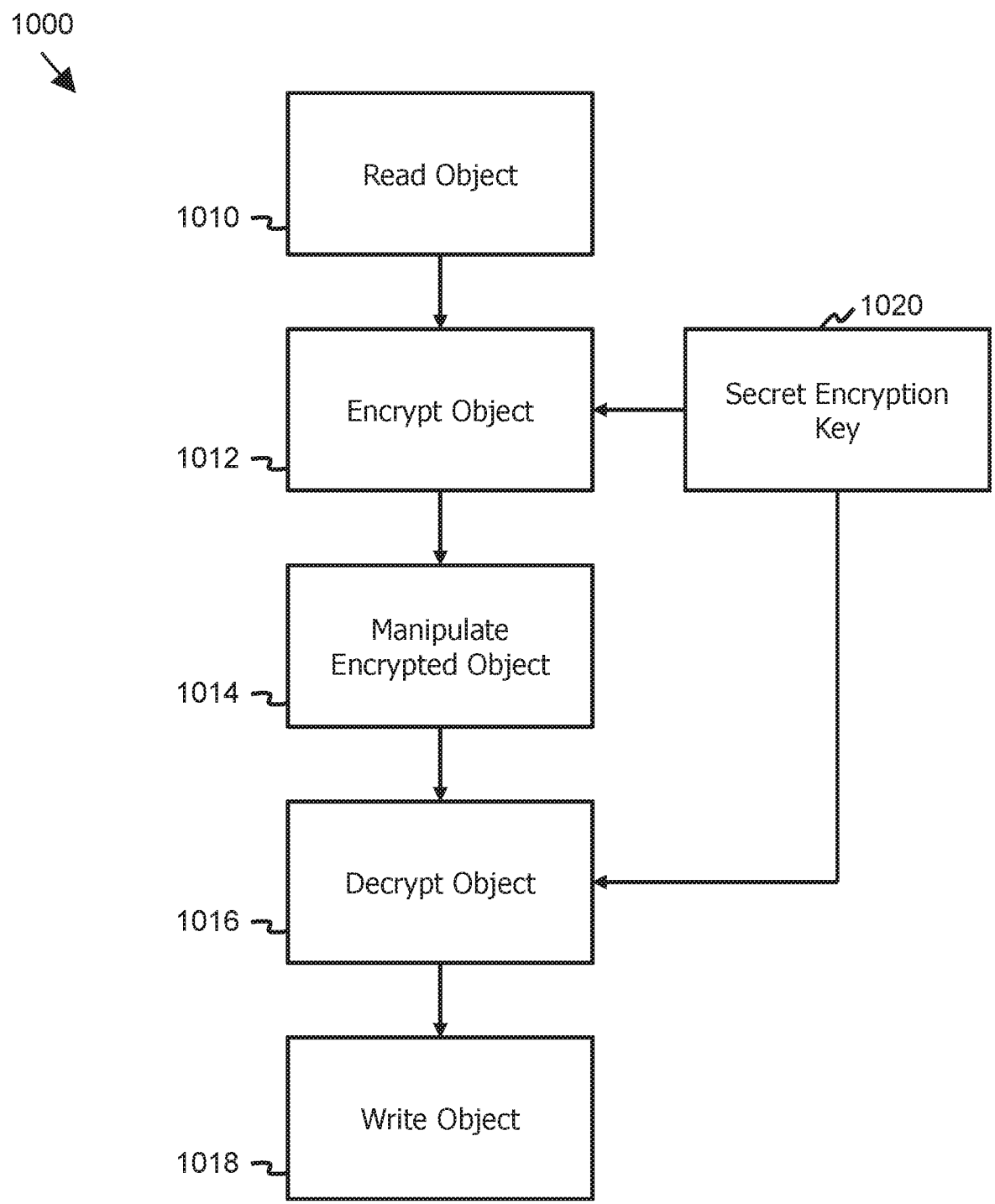
FIG. 6 illustrates an example embodiment of a method for secure replication of data object using a distributed object storage system.

As shown in FIG. 6, the distributed storage system 1 may be operated according to a secure object replication method for replicating, moving, or otherwise manipulating data objects without exposing application user data, i.e. according to the method 1000 illustrated by the blocks 1010-1020 of FIG. 6.

When a data object is to be manipulated by a replication user, such as administrative users 12.1-12.3 or system managers 520.1-520.3, a read object command may be executed in block 1010. The read object command may comply with a standard object storage operation, such as a GET command to a first data location based on a data object URL for an identified data object. The read object command may also include read user credentials for the identified data object that correspond to a non-application user credential and these user credentials may require that data returned by the read object command be routed to an encrypt engine, such as encrypt/decrypt engines 524.1-524.3.

At block 1012, the identified data object may be encrypted. For example, encrypt/decrypt engines 524.1-524.3 may directly receive the data read from the first storage location and corresponding to the identified data object or parts thereof. Encrypt/decrypt engines 524.1-524.3 may encrypt the data corresponding to the identified data object to generate or create a corresponding encrypted data object or part thereof. Encrypt/decrypt engines 524.1-524.3 may use receive, store, and/or generate a secret encryption key from block 1020 to use in encrypting the identified data object and generating the encrypted data object.

At block 1014, the encrypted data object may be manipulated by a controller node, such as controller nodes 20.1-20.4, to work on a system task initiated by an administrative user or system manager. For example, the identified data object may have been selected for replication across one or more other storage locations. The encrypted data object may be cached, streamed, or written to one or more local memories, processes, or other storage locations with reduced risk of the underlying application data being compromised. In some embodiments, this may include writing the encrypted data object to a storage node in a location that may not include a decrypt engine, such as location 502.4, and storing the encrypted data object to provide backup or otherwise maintain the encrypted data object until the corresponding data object is needed (and proceeding to block 1016. Note that the manipulation in block 1014 may include streaming or otherwise communicating the encrypted object over one or more secure communication channels employing their own encryption standards. The encryption in any secure communication channels, such as HTTPS, is independent of the data object level data encryption of block 1012.

At block 1016, the identified data object may be decrypted from the encrypted data object. For example, encrypt/decrypt engines 524.1-524.3 may receive the encrypted data object or parts thereof from a data stream, cache, or other source. Encrypt/decrypt engines 524.1-524.3 may decrypt the encrypted data corresponding to the identified data object or parts thereof to recreate the identified data object. The identified data object may be provided directly to an object storage agent, such as object storage agents 526.1-526.4, for writing to a second location without being cached or otherwise made accessible to administrative users of controller nodes 20.1-20.4. Encrypt/decrypt engines 524.1-524.3 may use receive, store, and/or generate a secret encryption key from block 1020 to use in decrypting the encrypted data object and recreating the identified data object.

At block 1018, the identified data object may be written to the second location in its original, unencrypted state through a write object command. The write object command may comply with a standard object storage operation, such as a PUT command to the second data location based on the destination URL for the identified data object. The write object command may also include write user credentials for the identified data object that correspond to a non-application user credential and these user credentials may require that data be received from a decrypt engine, such as encrypt/decrypt engines 524.1-524.3. The identified data object written to the second data location may be indistinguishable from a data object manipulated using application user credentials once it is stored in the second data location.

Figure 7:
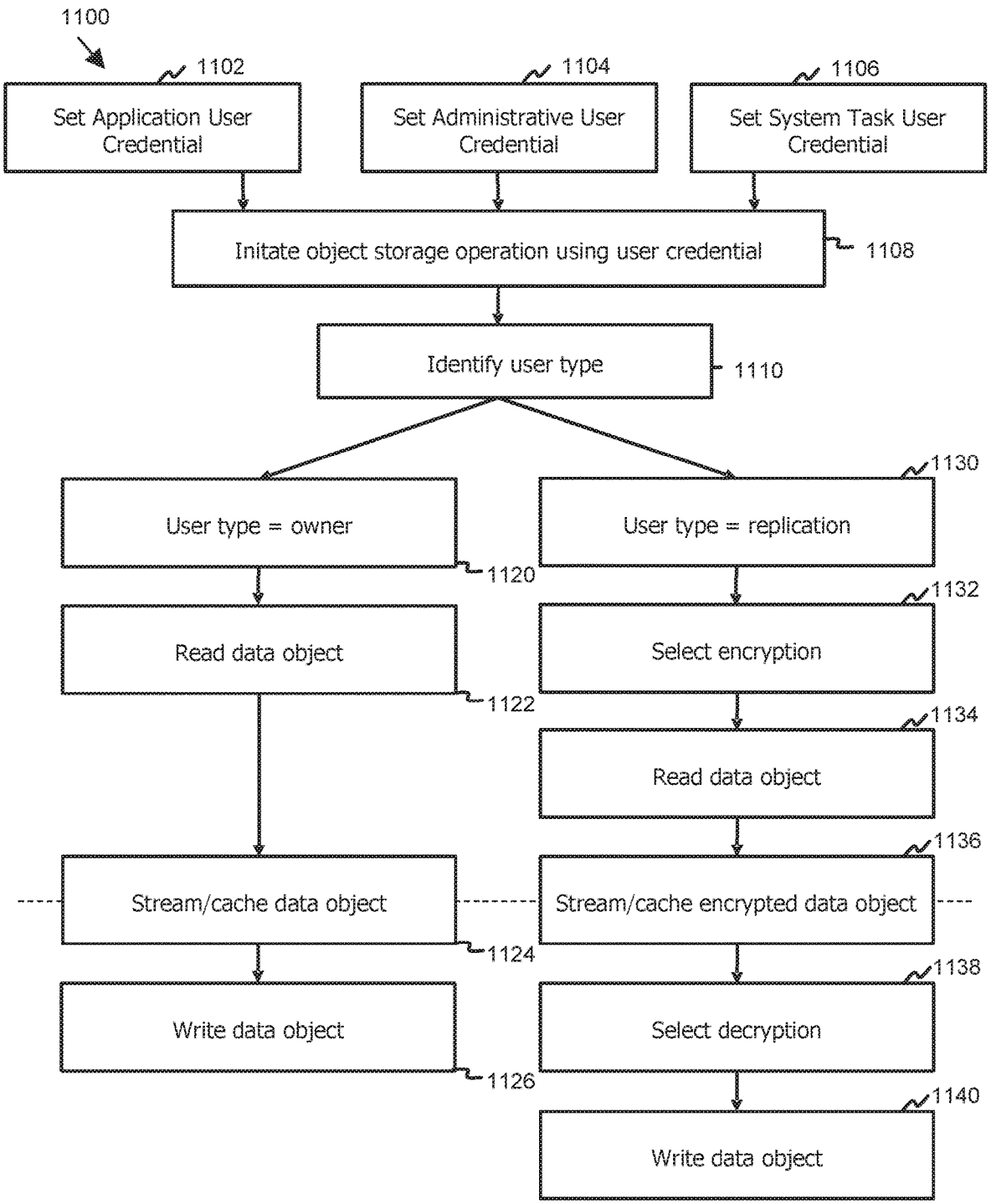
FIG. 7 further illustrates the example method of FIG. 6 with regard to a selective encryption based on user credentials.

As shown in FIG. 7, a distributed object storage system, such as distributed object storage system 500, may implement a method 1100 of selectively using an encryption/decryption read/write path for replication versus owner users. In some embodiments, the method 1000 of FIG. 6 may be used for the replication path.

In some embodiments, selection of the owner or replication path may be based on user credentials. At block 1102, one or more user credentials may be set for application users. For example, one or more users associated with an enterprise that hosts one or more applications may be assigned bucket read and/or write privileges. These application user credentials may be managed by one or more application users and authenticated by object storage system 500 for each object storage operation received from application users for accessing application data stored on object storage system 500. At block 1104, one or more user credentials may be set for administrative users. For example, administrative users may be employed by the organization hosting one or more components of object storage system 500. Administrative users may have responsibility for system related data management tasks and may not need access to the content of application data objects for completing system tasks. At block 1106, one or more user credentials may be set for system tasks executed autonomously by controller nodes, such as controller nodes 20.1-20.4. For example, a system manager may include a replication work schedule for initiating data replication tasks based on schedule, conditions, events, or more complex data management algorithms. The system manager may be assigned system task user credentials for reading and writing data objects to manage replication or other data management functions.

At block 1108, an object storage operation may be initiated using a user credential. For example, an HTTP call including an S3 compliant object storage command may include user read credentials for an identified data object URL and user write credentials for a destination location for replication. The object storage operation may be initiated by an application user with an application user credential, an administrative user with an administrative user credential, a system manager with a system task user credential, or other user credentials. The object storage command may be received by a controller node associated with one or more storage nodes that may contain the identified data object.

At block 1110, a user type may be identified from the object storage operation and/or related metadata. In some embodiments, the user type may explicitly relate to trust level, include an owner user type and a replication user type, and all object storage operations may include a designation of whether the related user credential is an owner user type or a replication user type. For example, each object storage command may include a flag or other field in the related metadata or transient variables (such as a session or connection instance) designating the user credential as an owner user credential or a replication user credential. In some embodiment, one or more functional user definitions, such as application user, administrative user, and system task user may map to owner or replication user types based on a lookup table or entry in a user credential authentication matrix. For example, application user credentials may correspond to the owner user type and administrative user credentials and system task user credentials may correspond to the replication user type. In some embodiments, user type may be identified by authenticators 522.1-522.3. For example, authenticators 522.1-522.3 may receive all incoming object storage operations involving data access and determine both whether the user credentials allow read and/or write access to the identified data object and, if so, whether the user credential is an owner type or replication type.

At block 1120, user type may be identified as an owner user type. For example, authenticators 522.1-522.3 may have read a flag or other metadata/variable and/or looked up the user credential for authentication and identified the owner user type. In some embodiments, the owner user credential and related object storage operation are processed through an existing read/write, replication, or other data manipulation path for application user read/write credentials to complete blocks 1122, 1124, 1126. At block 1122, an identified data object may be read from a storage location using the user credentials. At block 1124, the identified data object may be streamed, cached, or otherwise manipulated in accordance with the initiated object storage operation. In some embodiments, the identified data object may be moved between controller nodes and/or storage locations. At block 1126, the identified data object may be written to a storage location in accordance with the initiated object storage operation.

At block 1130, user type is identified as a replication user type. For example, authenticators 522.1-522.3 may have read a flag or other metadata/variable and/or looked up the user credential for authentication and identified the replication user type. In some embodiments, the replication user credential and related object storage operation are selectively processed through a special read/write, replication, or other data manipulation path for non-application user read/write credentials similar to the method 1000 in FIG. 6 to complete blocks 1132, 1134, 1136, 1138, 1140. At block 1132, an encryption path may be selected for reading the data object. For example, the GET operation or related data processing may require that the returned data be routed through encrypt/decrypt engines 524.1-524.3. At block 1134, the data object is read in accordance with selected encryption path. For example, as data is returned from storage nodes 30.1-30.40 to controller node 20, it passes through encrypt/decrypt engines 524.1-524.3. In block 1136, an encrypted data object corresponding to the identified data object may be streamed, cached, or otherwise manipulated in accordance with the initiated object storage operation. Because of encryption of the data object as it is read, the data content belonging to the application user may not be accessible from cache memory or other memory used to stream or maintain open connections. In some embodiments, the encrypted data object is moved between controller nodes and/or storage locations. At block 1138, a decryption path may be selected for writing the data object. For example, the PUT operation or related data processing may require that the date to be written from controller node 20 passes through encrypt/decrypt engines 524.1-524.3. At block 1140, the identified data object (in its unencrypted state) may be written to a storage location in accordance with the initiated object storage operation through the selected decryption path. As a result, the original identified data object may be stored in the destination location without being exposed to replication users of controller node 20.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A computer-implemented method, comprising:
    initiating, using a user credential having a replication user type, an object storage operation for:
       reading an identified data object from a first storage node; and
       writing the identified data object to a second storage node;
    reading, using the user credential, the identified data object from the first storage node;
    encrypting, in a read path of the first storage node and responsive to the user credential, read operations to return an encrypted data object corresponding to the identified data object;
    moving, responsive to receiving the encrypted data object, the encrypted data object from the first storage node to the second storage node;
    decrypting, in a write path of the second storage node and responsive to the user credential, write operations from the encrypted data object; and
    writing, using the user credential, the identified data object to the second storage node, wherein the object storage operation prevents the replication user type from accessing the identified data object in an unencrypted state during the object storage operation.

2. The computer-implemented method of claim 1, wherein:
    the user credential has a user type;
    the user type is selected from:
       an owner user type; and
       the replication user type;
    the computer-implemented method further comprises identifying, from the object storage operation, the user type from the user credential for the object storage operation;
    encrypting read operations is selectively executed based on the user type being the replication user type; and
    decrypting read operations is selectively executed based on the user type being the replication user type.

3. The computer-implemented method of claim 2, wherein reading the identified data object and writing the identified data object are executed by a controller node configured to communicate with a plurality of storage nodes, the plurality of storage nodes including the first storage node and the second storage node.

4. The computer-implemented method of claim 3, wherein identifying the user type from the user credential is executed by an authenticator in communication with the controller node.

5. The computer-implemented method of claim 3, wherein:
    encrypting read operations is executed by an encrypt engine in communication with the controller node; and
    decrypting write operations is executed by a decrypt engine in communication with the controller node.

6. The computer-implemented method of claim 2, wherein:
    reading the identified data object includes sending a first hypertext transfer protocol (HTTP) call conforming to a simple storage services application protocol interface (API) GET operation to the first storage node; and
    writing the identified data object includes sending a second HTTP call conforming to a simple storage services API PUT operation to the second storage node.

7. The computer-implemented method of claim 2, wherein:
    identifying the user type from the user credential, encrypting read operations, and decrypting write operations are executed by a proxy application; and
    the object storage operation is processed by the proxy application prior to reading and writing the identified data object.

8. The computer-implemented method of claim 2, wherein:
    the user type is a flag associated with the object storage operation;
    a first value of the flag is the owner user type; and
    a second value of the flag is the replication user type.

9. The computer-implemented method of claim 2, further comprising setting the user type for the object storage operation to the replication user type for system tasks not initiated by an application user.

10. The computer-implemented method of claim 2, further comprising storing the identified data object in a cache memory after reading the identified data object from the first storage node and before writing the identified data object to the second storage node.

11. The computer-implemented method of claim 1, wherein:
    the first storage node and the second storage node are in different storage systems; and
    encrypting read operations and decrypting write operations use a common encryption key.

12. A system, comprising:
    means for initiating, using a user credential, an object storage operation for:
       reading an identified data object from a first storage node; and;
       writing the identified data object to a second storage node, wherein:
          the user credential has a user type; and
          the user type is selected from:
             an owner user type; and
             a replication user type;
    means for identifying the user type from the user credential for the object storage operation;
    means for selectively encrypting, in a read path of the first storage node and responsive to the user credential having the replication user type, read operations to encrypt the identified data object;
    means for reading, using the user credential and selective encryption, the identified data object from the first storage node;
    means for moving, responsive to receiving the identified data object, the identified data object from the first storage node to the second storage node;
    means for selectively decrypting, in a write path of the second storage node and responsive to the user credential having the replication user type, write operations; and
    means for writing the identified data object to the second storage node, wherein the object storage operation prevents the replication user type from accessing the identified data object in an unencrypted state during the object storage operation.

13. A storage system, comprising:
    a plurality of storage nodes configured to receive and store data objects; and
    a controller node configured to:
       initiate, using a user credential having a replication user type, an object storage operation for:

reading an identified data object from a first storage node; and
writing the identified data object to a second storage node;
read, using the user credential, the identified data object from the first storage node;
encrypt, in a read path of the first storage node and responsive to the user credential, read operations to return an encrypted data object corresponding to the identified data object;
move, responsive to receiving the encrypted data object, the encrypted data object from the first storage node to the second storage node;
decrypt, in a write path of the second storage node and responsive to the user credential, write operations from the encrypted data object; and
write, using the user credential, the identified data object to the second storage node, wherein the object storage operation prevents the replication user type from accessing the identified data object in an unencrypted state during the object storage operation.

14. The storage system of claim 13, wherein:
the user credential has a user type;
the user type is selected from:
an owner user type; and
the replication user type;
encrypting read operations is selectively executed based on the user type being the replication user type;
decrypting read operations is selectively executed based on the user type being the replication user type; and
the controller node is further configured to identify, from the object storage operation, the user type from the user credential for the object storage operation.

15. The storage system of claim 14, wherein the controller node is further configured to communicate with an authenticator for identifying the user type from the user credential.

16. The storage system of claim 14, wherein the controller node is further configured to communicate with:
an encrypt engine for encrypting read operations in the read path from the first storage node; and
a decrypt engine for decrypting write operations in the write path to the second storage node.

17. The storage system of claim 14, wherein:
reading the identified data object includes sending a first hypertext transfer protocol (HTTP) call conforming to a simple storage services application protocol interface (API) GET operation to the first storage node;
writing the identified data object includes sending a second HTTP call conforming to a simple storage services API PUT operation to the second storage node; and
the HTTP calls are encrypted for routing among the controller node, the first storage node, and the second storage node independent of encrypting the identified data object in the read path of the first storage node.

18. The storage system of claim 14, wherein:
identifying the user type from the user credential, encrypting read operations, and decrypting write operations are executed by a proxy application in communication with the controller node; and
the object storage operation is processed by the proxy application prior to reading and writing the identified data object.

19. The storage system of claim 14, wherein the controller node is further configured to store the identified data object in a cache memory:
after reading the identified data object from the first storage node; and
before writing the identified data object to the second storage node.

20. The storage system of claim 14, wherein:
the second storage node is in different storage system; and
encrypting read operations and decrypting write operations use a common encryption key.

* * * * *